United States Patent
Agarwal et al.

(10) Patent No.: US 11,396,825 B2
(45) Date of Patent: Jul. 26, 2022

(54) TURBINE DIAGNOSTIC FEATURE SELECTION SYSTEM

(71) Applicant: General Electric Company, Schenectady, NY (US)

(72) Inventors: Anurag Agarwal, Bangalore (IN); Rajesh Alla, Bangalore (IN); Frank Gruber, Springboro, OH (US); Lorenzo Escriche, Hamilton, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1034 days.

(21) Appl. No.: 15/676,506

(22) Filed: Aug. 14, 2017

(65) Prior Publication Data
US 2019/0048740 A1   Feb. 14, 2019

(51) Int. Cl.
| | | |
|---|---|---|
| *F01D 21/00* | (2006.01) | |
| *G06N 20/00* | (2019.01) | |
| *G06F 16/28* | (2019.01) | |
| *G06F 16/2457* | (2019.01) | |
| *F01D 17/02* | (2006.01) | |

(52) U.S. Cl.
CPC .......... *F01D 21/003* (2013.01); *F01D 17/02* (2013.01); *G06F 16/24578* (2019.01); *G06F 16/285* (2019.01); *G06N 20/00* (2019.01); *F05D 2260/81* (2013.01)

(58) Field of Classification Search
CPC ...... F01D 21/003; G06F 16/285; G06N 20/00
See application file for complete search history.

(56) References Cited

U.S. PATENT DOCUMENTS

| | | |
|---|---|---|
| 6,625,569 B2 | 9/2003 | James et al. |
| 7,080,290 B2 | 7/2006 | James et al. |
| 8,112,368 B2 | 2/2012 | Eklund et al. |
| 8,190,537 B1 | 5/2012 | Singh et al. |
| 8,788,439 B2 | 7/2014 | Martinez et al. |
| 9,218,694 B1 | 12/2015 | Kipersztok et al. |

(Continued)

FOREIGN PATENT DOCUMENTS

WO    2016/040085 A1    3/2016

OTHER PUBLICATIONS

Zhang, Yu, et al. "Applied fault detection and diagnosis for industrial gas turbine systems." International Journal of Automation and Computing 14.4 (2017): 463-473. (Year: 2016).*

(Continued)

*Primary Examiner* — Kevin W Figueroa
(74) *Attorney, Agent, or Firm* — Amin, Turocy & Watson, LLP

(57) ABSTRACT

A turbine diagnostic machine learning system builds one or more turbine engine performance models using one or more parameter or parameter characteristics. A model of turbine engine performance includes ranked parameters or parameter characteristics, the ranking of which is calculated by a model builder based upon a function of AIC, AUC and p-value, resulting in a corresponding importance rank. These raw parameters and raw parameter characteristics are then sorted according to their importance rank, and selected by a selection component to form one or more completed models. The one or more models are operatively coupled to one or more other models to facilitate further machine learning capabilities by the system.

20 Claims, 14 Drawing Sheets

(56) References Cited

U.S. PATENT DOCUMENTS

| | | | |
|---|---|---|---|
| 9,563,198 B2 | 2/2017 | Anup et al. | |
| 2004/0148940 A1* | 8/2004 | Venkateswaran | F01D 17/085 60/772 |
| 2004/0176887 A1 | 9/2004 | Kent et al. | |
| 2005/0216426 A1 | 9/2005 | Weston et al. | |
| 2013/0123189 A1* | 5/2013 | Tchelet | A61K 38/02 514/17.9 |
| 2013/0179388 A1 | 7/2013 | Agarwal et al. | |
| 2013/0184838 A1* | 7/2013 | Tchoryk, Jr. | G01S 17/95 700/31 |
| 2016/0026917 A1 | 1/2016 | Weisberg et al. | |
| 2016/0290280 A1* | 10/2016 | Blankenship | F02C 6/18 |
| 2018/0173599 A1* | 6/2018 | Kalech | G06F 11/008 |
| 2018/0275044 A1* | 9/2018 | Surana | G01M 99/008 |

OTHER PUBLICATIONS

Vanini, ZN Sadough, Kash Khorasani, and Nader Meskin. "Fault detection and isolation of a dual spool gas turbine engine using dynamic neural networks and multiple model approach." Information Sciences 259 (2014): 234-251. (Year: 2014).*

International search report and written opinion received for PCT application No. PCT/US2018/045472 dated Nov. 28, 2018, 14 pages.

Zena M. Hira et al., 'A Review of Feature Selection and Feature Extraction Methods Applied on Microarray Data', vol. 2015, Jun. 11, 2015, pp. 1-13<URL: https://www.hindawi.com/journals/abi/2015/198363></URL:> See p. 2, left column; p. 10.

Turin Srivastava, 'Machine Learning Algorithms to Classify Spinal Muscular a Trophy Subtypes', Jul. 24, 2012, pp. 358-364 <URL: https://www.ncbi.nlm.nih.gov/pmc/articles/PMC3400094></URL:> See abstract; pp. 359-360; and figure 1.

Extended European search report received for European application No. 18845610.7 dated Apr. 16, 2021, 13 pages.

Communication pursuant to Rules 70(2) and 70a(2) EPC received for European application No. 18845610.7 dated May 4, 2021, 1 page.

Communication pursuant to Rules 161(2) and 162 EPC received for European application No. 18845610.7 dated Mar. 24, 2020, 3 pages.

* cited by examiner

TURBINE DIAGNOSTIC FEATURE SELECTION SYSTEM

TECHNICAL FIELD

The subject matter disclosed herein relates generally to feature selection, and, more particularly, the optimization of selecting one or more turbine jet engine parameters associated in one or more ways with a failure event.

BACKGROUND

The loss of engine operation in an aircraft or most any critical piece of equipment in a live operations setting often can result in idle time while an airplane is delayed at a gate or on a tarmac. This loss of time can often result in one or more of many extraneous costs above a projected operating budget. Additional costs can appear in the form of incremental maintenance costs, opportunity costs of not servicing a customer, downstream adjustments made to subsequent flight plans or the quality impact made to a brand.

This loss of time hinges substantially on a maintenance team's abilities to correctly diagnose a failure event with respect to identifying a direct cause for the failure. The correct identification of one or more performance parameters with respect to equipment failure events can directly indicate an equipment component or part that was cause for the failure.

Such efforts to accurately link parameters to equipment failures are met with the challenge of selecting parameters from an exceedingly large grouping of parameter candidates. Current methods of feature selection result in a prohibitive amount of time lost between a failure event and accurate parameter selection.

The aforementioned deficiency of current feature selection methods within one or more operations settings is merely intended to provide an overview of some of the barriers of current methods, rather than be fully comprehensive. Additional drawbacks of the current state of the art and the subsequent benefits of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

One or more embodiments provide a system for selecting one or more equipment performance parameters, or "features", is provided, comprising a raw parameter analyzer configured to identify one or more characteristics associated with a set of raw parameters; a model builder that builds a classification model based on one or more characteristics or parameters at a time of the set of raw parameters, computing Akaike Information Criterion (AIC), Area under Curve (AUC), and hypothesis acceptance as per alpha error, or p value; a ranking component, that computes importance rank for respective raw parameters based on the respective AIC, AUC, and p-value; a sorting component that sorts features based on respective raw parameter importance ranking; and a selection component that selects N features, N>1 based on the sorting to utilize in connection with building the classification model.

Also, in one or more embodiments, a method for selecting one or more equipment performance parameters is provided, comprising identifying, by a system comprising at least one processor, one or more characteristics associated with a set of respective raw performance parameters; building, by the system, a classification model based on one parameter at a time of the set of raw parameters using computed Akaike Information Criterion (AIC), Area under Curve (AUC) and hypothesis acceptance as per alpha error (p-value); computing, by the system an importance rank for respective raw parameters based on the respective computed AIC, AUC, and p-value; sorting, by the system, one or more features based on characteristics of or direct values of raw parameters importance rankings; and selecting, by the system, one or more features based on the sorted features based upon rank to utilize in connection with building the classification model.

Also, according to one or more embodiments, a non-transitory computer-readable medium is provided having stored thereon instructions that, in response to execution, cause a system comprising at least a processor to perform operations, the operations comprising identifying one or more characteristics associated with a set of respective raw parameters; building a classification model based on one parameter characteristic or raw parameter at a time of the set of raw parameters or parameter characteristics using computed Akaike Information Criterion (AIC), Area under Curve (AUC) and hypothesis acceptance as per alpha error (p-value); computing an importance ranking for respective raw parameters or raw parameter characteristics based on the respective computed AIC, AUC and p-value; sorting features based on respective raw parameter or raw parameter characteristic importance ranking; and selecting one or more features based on the sorting to utilize in connection with building the classification model.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

DETAILED DESCRIPTION

Figure 1:
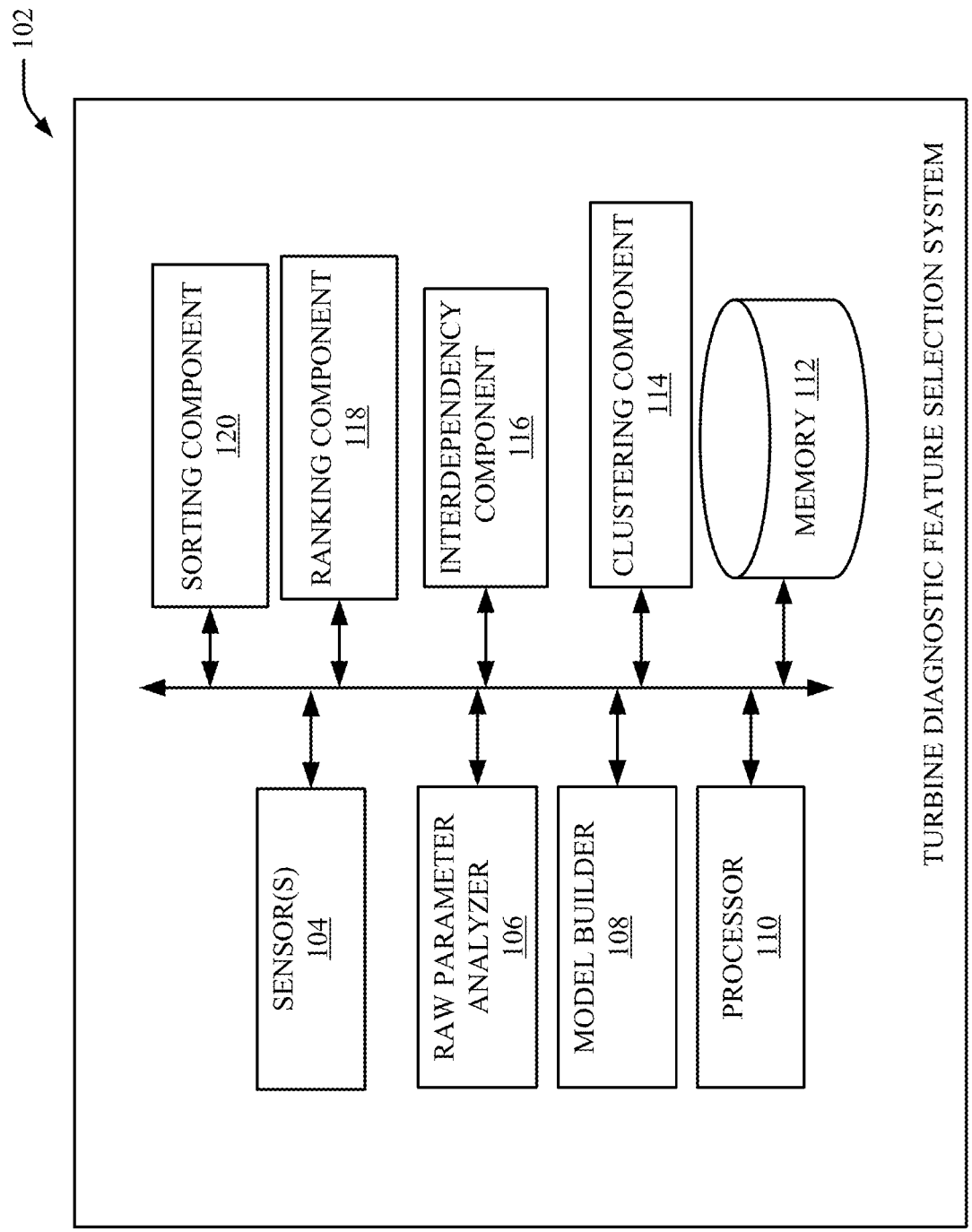
FIG. 1 is a block diagram of an example turbine diagnostic feature selection system.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As used in the subject specification and drawings, the terms "object," "module," "interface," "component," "system," "platform," "engine," "selector," "manager," "unit," "store," "network," "generator" and the like are intended to refer to a computer-related entity or an entity related to, or that is part of, an operational machine or apparatus with a specific functionality; such entities can be either hardware, a combination of hardware and firmware, firmware, a combination of hardware and software, software, or software in execution. In addition, entities identified through the foregoing terms are herein generically referred to as "functional elements." As an example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer-readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As an example, a component can be an apparatus with specific functionality provided by mechanical parts operated by electric or electronic circuitry, which is operated by software, or firmware application executed by a processor, wherein the processor can be internal or external to the apparatus and executes at least a part of the software or firmware application. As another example, a component can be an apparatus that provides specific functionality through electronic components without mechanical parts, the electronic components can include a processor therein to execute software or firmware that confers at least in part the functionality of the electronic components. Interface(s) can include input/output (I/O) components as well as associated processor(s), application(s), or API (Application Program Interface) component(s). While examples presented hereinabove are directed to a component, the exemplified features or aspects also apply to object, module, interface, system, platform, engine, selector, manager, unit, store, network, and the like.

FIG. 1 is a block diagram of an example turbine diagnostic feature selection system according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Turbine diagnostic feature selection system 102 can include sensor(s) 104, a raw parameter analyzer 106, a model builder 108, processor(s) 110, a memory 112, a clustering component 114, an interdependency component 116, a ranking component 118, and a sorting component 120. In various embodiments, sensor(s) 104, a raw parameter analyzer 106, a model builder 108, a processor 110, a memory 112, a clustering component 114, an interdependency component 116, a ranking component 118, and a sorting component 120 can be electronically and/or communicatively coupled to one another to perform one or more of the functions of the turbine diagnostic feature learning system 102. In some embodiments, one or more of components 104, 106, 108, 114, 116, 118, and 120 can comprise software instructions stored on memory 112 and executed by processor(s) 110. Turbine diagnostic feature selection system 102 may also interact with other hardware and/or software components not depicted in FIG. 1. For example, processor(s) 110 may interact with one or more external user interface devices, such as a keyboard, a mouse, a display monitor, a touch-screen, a Human Machine Interface (HMI), or any other suitable interface devices.

Sensor(s) 104 can be configured to receive and relay data representing measured raw parameter values of a jet engine. Raw performance parameters that can be represented by the data from sensor(s) 104 can be, but are not limited to, turbine fan speed, fan stress, exhaust gas temperature, fuel flow rate, turbine electrical current draw, or other such measured parameters.

Raw parameter analyzer 106 can be configured to calculate characteristics of one or more raw parameters based on measured data received from sensor(s) 104, and generate one or more values that can be processed by the model builder 108. Raw parameter characteristics can include, but are not limited to, the sum, mean, maximum, difference, median, or standard deviation of any one or more raw parameters. For the sake of simplicity, it can be understood that "throughout this document", mention of "feature" or "features" can refer to one or more raw parameters, raw parameter characteristics, or any groupings of either or both formed therein. Groupings, as mentioned in this context, can include clusters of individual features or groupings in addition to feature clusters.

Model builder 108 can be configured to receive one or more raw parameters from the sensor(s) 104 or raw parameter characteristics from raw parameter analyzer 106. The model builder 108 can compute one or more derived values based upon the raw parameters or raw parameter characteristics including, but not limited to Akaike Information Criterion (AIC), Area under Curve (AUC), and p-value. As detailed below, these derived values are used by the ranking component 118 to calculate an importance rank associated with one or more raw parameters, raw parameter characteristics, or any combinations therein.

The one or more processors 110 can perform one or more of the functions described herein with reference to the systems and/or methods disclosed. Memory 112 can be a computer-readable storage medium storing computer-executable instructions and/or information for performing the functions described herein with reference to the systems and/or methods disclosed.

Clustering component 114 can receive two or more raw parameters or raw parameter characteristics and combine two or more of the features into respective clusters and can compute one or more derived values based upon features including, but not limited to Akaike Information Criterion (AIC), Area under Curve (AUC), and p-value. As detailed below, these derived values are used by the ranking component 118 to calculate an importance rank associated with one or more raw parameters, raw parameter characteristics, or any combinations therein.

Interdependency component 116 can calculate interdependencies between one or more features or clusters of features combined by the clustering component 114. These interdependencies can be established using one or more methods, including, but not limited to use of a kernel method or various pattern analysis algorithms. A flow diagram illustrated in FIG. 7 and associated description will describe in further detail the function of interdependency component 116.

Ranking component 118 can be configured to compute importance rank for respective features based on computed AIC, AUC and p-value. As will be described in more detail below, a generic function (1) of these derived values can be employed to illustrate an example computation of the importance rank by the ranking component 118. Also described below is the use of the importance rank by sorting component 120 to arrange one or more features within a classification model generated by model builder 108.

Sorting component 120 can sort, based upon respective feature importance rank generated by the ranking component 118, features within a classification model built by model builder 108. The sorting of features by sorting component 120 can be based upon any suitable order, manipulation, or scheme performed or arranged by any of the aforementioned components.

The embodiments of devices described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect) described herein, one or more components can examine an entirety or a subset of data to which it is granted access and can provide for reasoning about or determine states of a system, environment, etc. from a set of observations as captured via events and/or data. Determinations can be employed to identify a specific context or action, and/or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z_1, z_2, z_3, z_4, z_n)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 2:
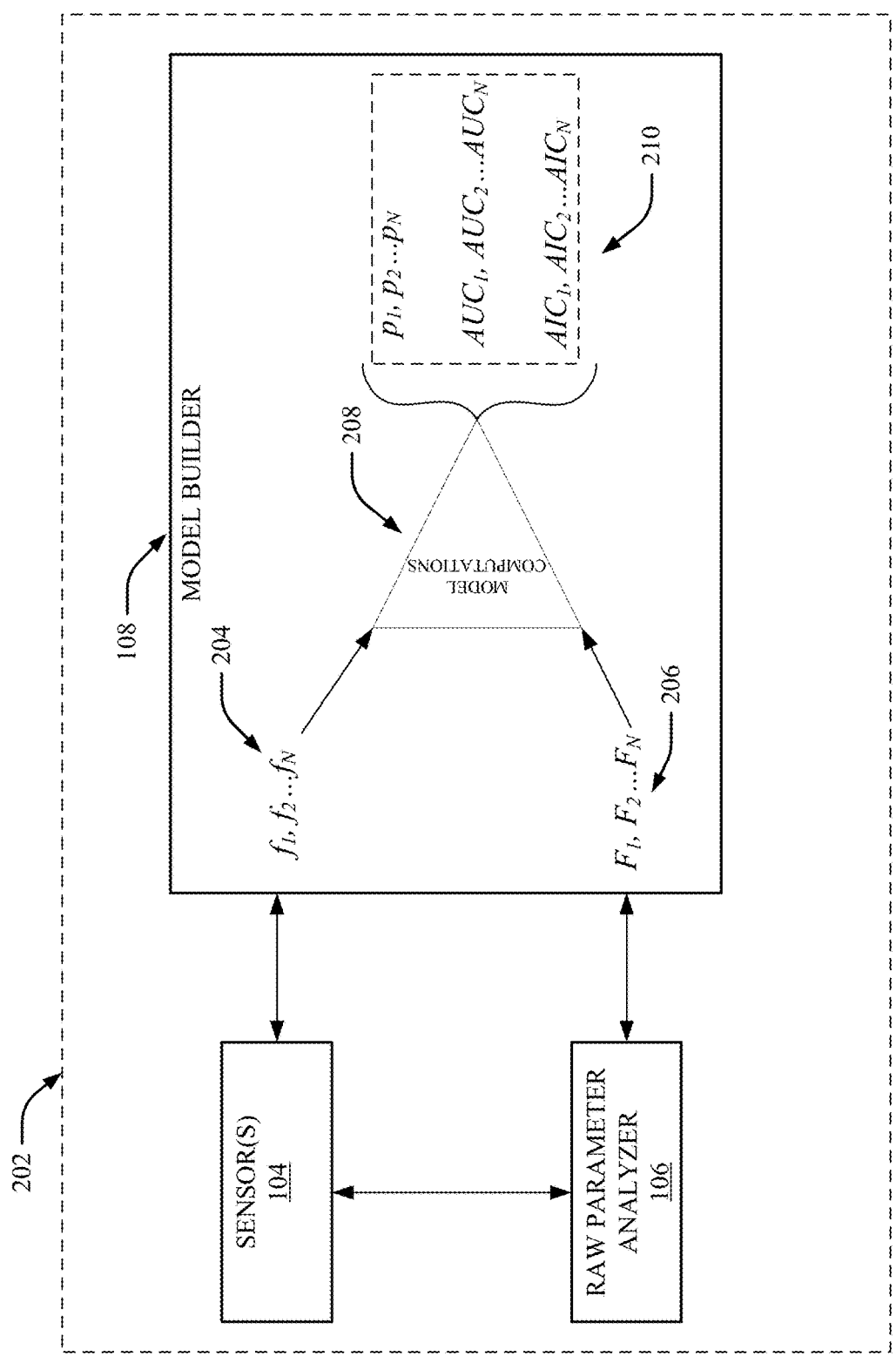
FIG. 2 is a diagram illustrating computation of AIC, AUC, and p-values of one or more raw parameters or raw parameter characteristics by the model builder.

FIG. 2 is a block diagram illustrating receiving, by the model builder 108, one or more features relayed by the sensor(s) 104 or the raw parameter analyzer 106. Derived values 210 can be generated based upon the received features by the model builder 108. Derived values 210 can include, but are not limited to Akaike Information Criterion (AIC), Area under Curve (AUC), and p-value. Derived values 210 can then be used by the ranking component 118 to calculate importance ranks of various features for use in a classification model.

Raw parameters $(f_1, f_2 \ldots f_N)$ 204 represent one ore more raw parameters received by the model builder from sensor(s) 104. In this example, $f_1, f_2 \ldots f_N$ are used to illustrate an integer N number of raw parameters to be analyzed by the model builder 108. It should be appreciated that sensor(s) 104 and raw parameter analyzer (106) can be considered to be operatively coupled considering that raw parameter values can be received by the raw parameter analyzer 106 from the sensor(s) 104 in order to identify characteristics associated with one or more of those raw parameters. In this aspect, $f_1, f_2 \ldots f_N$ can, in addition to being analyzed by the classification model, also be analyzed by the raw parameter analyzer, wherein characteristics associated with the respective raw parameters can be derived.

Raw parameter characteristics ($F_1, F_2, \ldots F_N$) 206 represent N number of raw parameter characteristics. These characteristics can include, but are not limited to, parameter mean, median, maximum, and standard deviation. Similarly to raw parameters 204, these raw parameter characteristics 206 can be received by the model builder 108 in order to compute Akaike Information Criterion (AIC), Area under Curve (AUC), and p-values associated with those respective characteristics.

Model computational component 208 is a computational block that can be configured to calculate Akaike Information Criterion (AIC), Area under Curve (AUC), and p-values associated with one or more raw parameters or raw parameter characteristics—the derived values 210. Written description of example functions and graphical representations pertaining to the calculation of Akaike Information Criterion (AIC), Area under Curve (AUC), and p-value are detailed in more depth below in connection with FIGS. 4 and 5.

Figure 3:
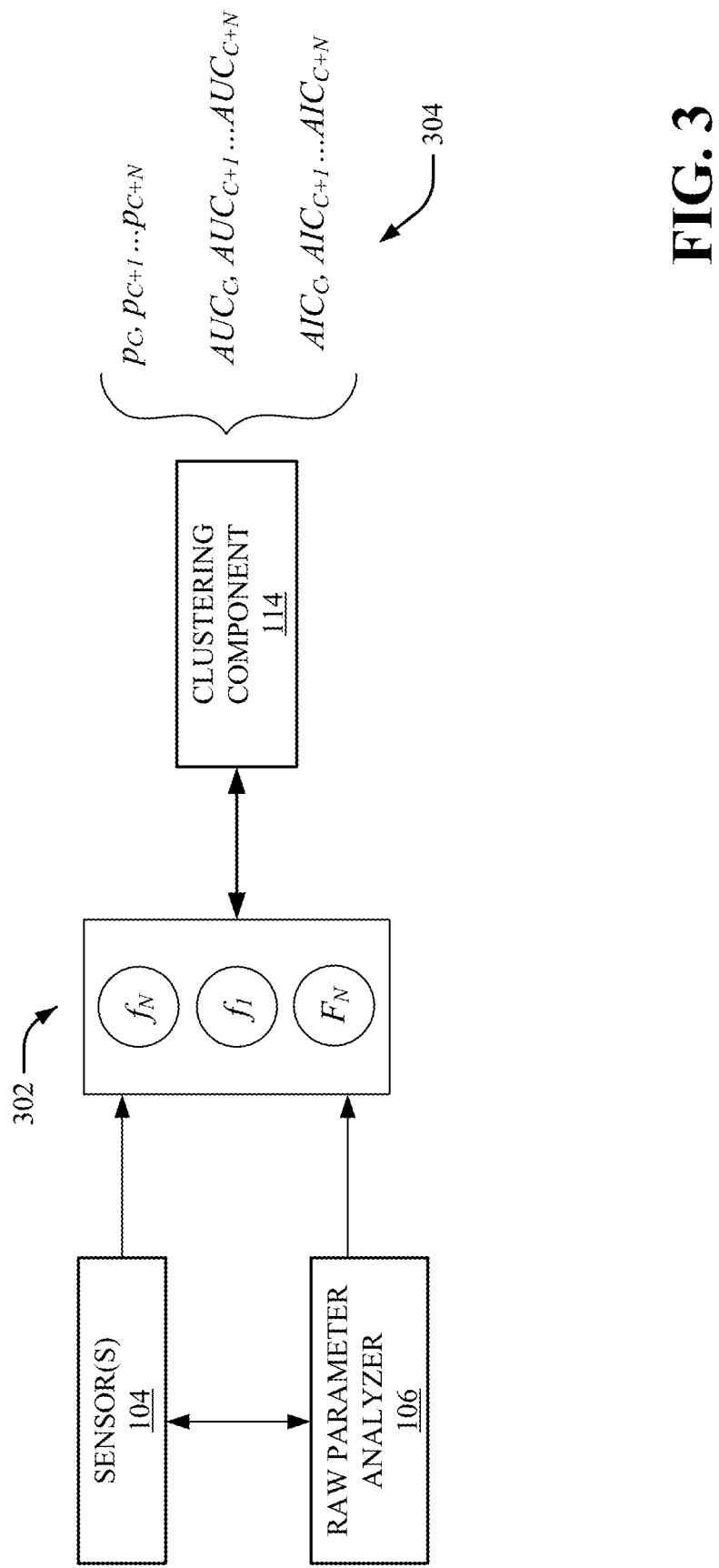
FIG. 3 is a diagram illustrating computation of AIC, AUC, and p-values of one or more clusters of raw parameters or raw parameter characteristics by the clustering component.

FIG. 3 is a block diagram illustrating grouping, by clustering component 114, one or more features into a cluster 302. In the present example, the clustering component 114 can compute, based upon respective cluster, Akaike Information Criterion (AIC), Area under Curve (AUC), and p-value for one or more clusters. In an aspect, the clustering component 114 can group one or more clusters or features and calculated Akaike Information Criterion (AIC), Area under Curve (AUC), and p-value for the resulting clusters, in cluster derived values 304.

It is worth mentioning that cluster 302 can be a grouping of any two or more features, whether they be raw parameters, characteristics associated with those parameters, or separate clusters. Additionally, in this aspect, elements 302 and 114 are shown as operatively coupled as it is to be understood that the clustering component 114 can be configured to both group one or more features, and to compute Akaike Information Criterion (AIC), Area under Curve (AUC), and p-value for the respective clusters.

Cluster derived values 304 can be one or more cluster derived values including Akaike Information Criterion (AIC), Area under Curve (AUC), and p-values associated with one or more clusters of features. These cluster derived values will be used in a function (1) described in more detail below.

Figure 4:
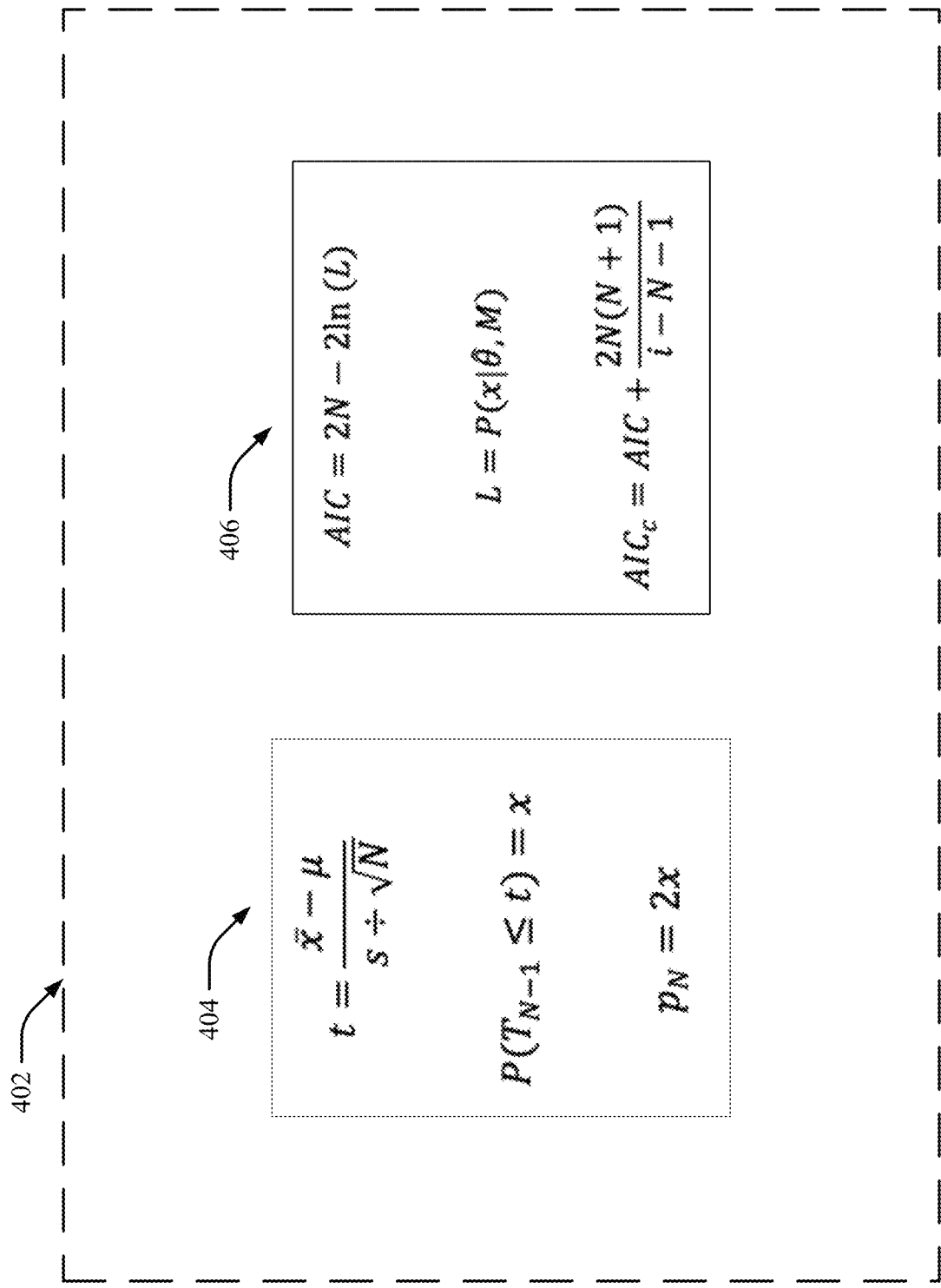
FIG. 4 is a listing of example functions for characterizing calculation of one or more p-values or AIC of one or more raw parameters or raw parameter characteristics.

FIG. 4 is an illustration of an example mathematical function block or component 402 that demonstrate known methods for calculation of p-value 404 and calculation of Akaike Information Criterion 406. These example functions, in addition to any suitable alternative functions, can be used by the model builder 108 or cluster component 114 for computation of derived values 210 or cluster derived values 304.

Function block/component 406 can execute an example function detailing computation of a p-value in a two-tailed hypothesis test. In this example, a hypothesis is formed with a desired confidence level 1−α. The value μ denotes a sample mean of which a hypothesis relationship is formed. For instance, a test could be performed to calculate a p-value to show if the null hypothesis $H_0$: μ=3 is true with consideration of a given error value α. 'X bar' is used here to describe the actual population mean used to calculate p-value. When finding the t-statistic, in this example, we will consider the desired value of N−1 degrees of freedom, N being the population size. As this example is a two-tailed test, it can be observed that the p-value will be twice the t-statistic, identified here as x.

Function block/component 408 can execute an example function detailing the computation of a corrected Akaike Information Criterion. The number of parameters is denoted by N. A expression illustrating the likelihood function of a statistical model M with some data x where θ represents the values that maximize the likelihood function. The corrected AIC is then calculated using the expression shown for $AIC_c$, where i is the sample size.

Figure 5:
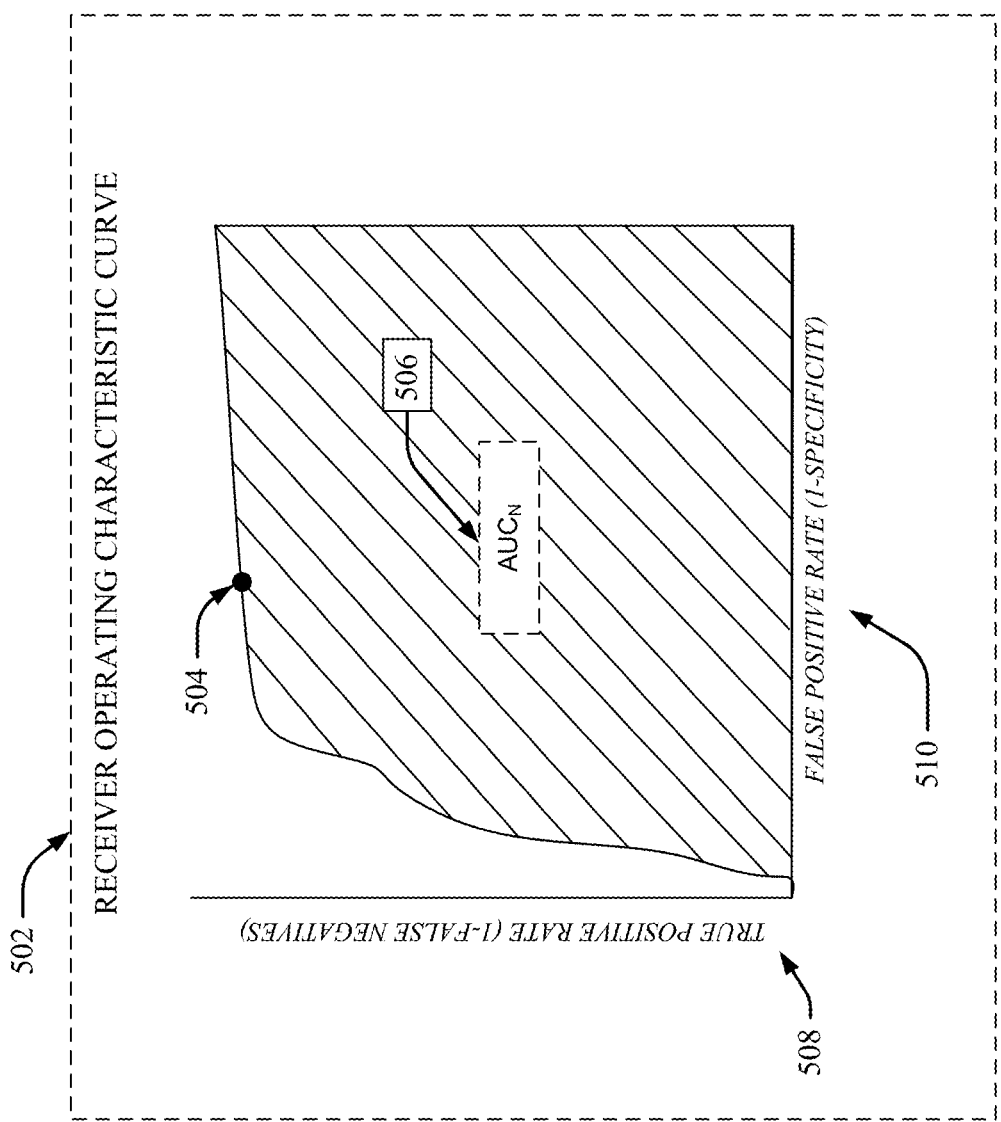
FIG. 5 is a graphical representation of the Area under a Curve, specifically a receiver operating characteristic curve.

FIG. 5 is a graphical representation conceptually illustrating the value of the Area under a curve for a one or more features. Receiver operating characteristic (ROC) curve 502 specifically illustrates the area under a curve for one or more receiver operating characteristics (AUROC). ROC 504 illustrates an example data point representing a receiver operating characteristic based upon any feature, where the data point is composed of coordinates along x-axis 510, and y-axis 508. $AUC_N$ 506 graphically illustrates an example AUROC value. The derivation of each coordinate value will be described in more detail below as a part of an example classifier confusion matrix 602.

Figure 6:
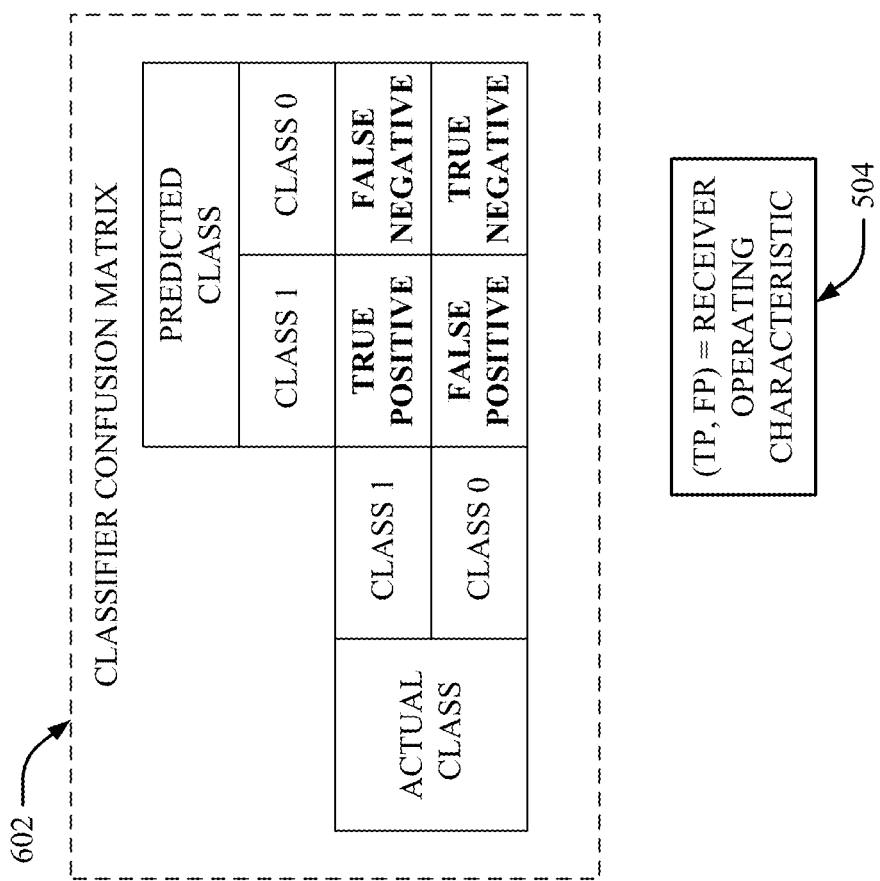
FIG. 6 is an example Receiver Operating Characteristic (ROC) confusion matrix demonstrating the graphical value of an ROC.

FIG. 6 features an example classifier confusion matrix 602 illustrating in detail the derivation of the coordinates of the ROC 504. The matrix demonstrates the binary classification of one or more features by the distinction of two outcome classes. A predicted Class of 1 denotes a predicted diagnosis of feature association with, for example, failure of a turbine engine or its components. Conversely, a predicted Class of 0 denotes that the predicted diagnosis will be that there is no association of one or more features with a failure event. An actual class of 1 denotes an eventual positive association of one or more features with, for example, failure of a turbine engine or its components, regardless of the predicted class. Similarly, an actual class of zero indicates a result that there is no association of one or more features in diagnosing an event. The predicted class of one or more features can be compared against the actual class to demonstrate effectiveness of the feature with respect to its use as an ROC 504. A feature as an ROC with high instances of correctly predicting a class will have high instances of correctly diagnosing the presence of a failure. This is referred to as the true positive rate of an ROC. Subsequently, the rate at which the predicted outcome of association with an event does not match decreases with the aforementioned high true positive rate. This is referred to as the false positive rate. An ROC can be derived by plotting the coordinates where the x-axis 510 is the false positive rate, and the y-axis 508 is the false positive rate.

Figure 7:
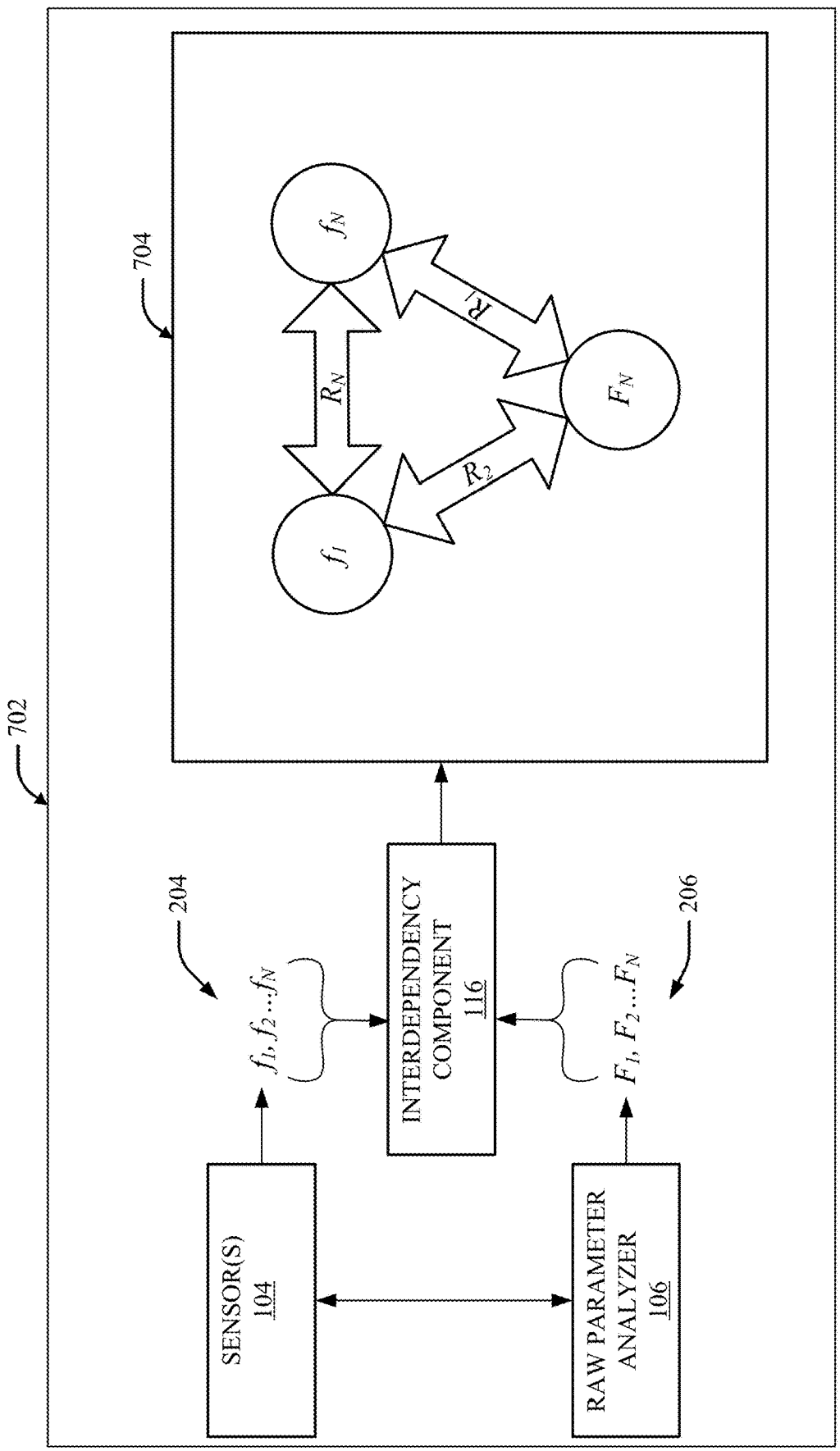
FIG. 7 is a diagram illustrating an overview of calculation of interdependencies of raw parameter or raw parameter characteristics by the interdependency component.

FIG. 7 is a block diagram illustrating the various interdependencies learned by the interdependency component 116. The feature interdependencies 704 are shown to learned based upon one or more raw parameters and raw parameter characteristics, however, this component can also be configured to learn interdependencies between one or more raw parameters, raw parameter characteristics, and one or more clusters of features. In general, the interdependency component 116 learns relevance of two or more features when considered together as opposed to separately. For example, a fluid temperature, flow rate, and pump amperage may have low rates of association independently, but when compared to each other, trend up and down in associative patterns, meriting consideration for use of the respective features as a feature cluster similar to cluster 302.

Figure 8:
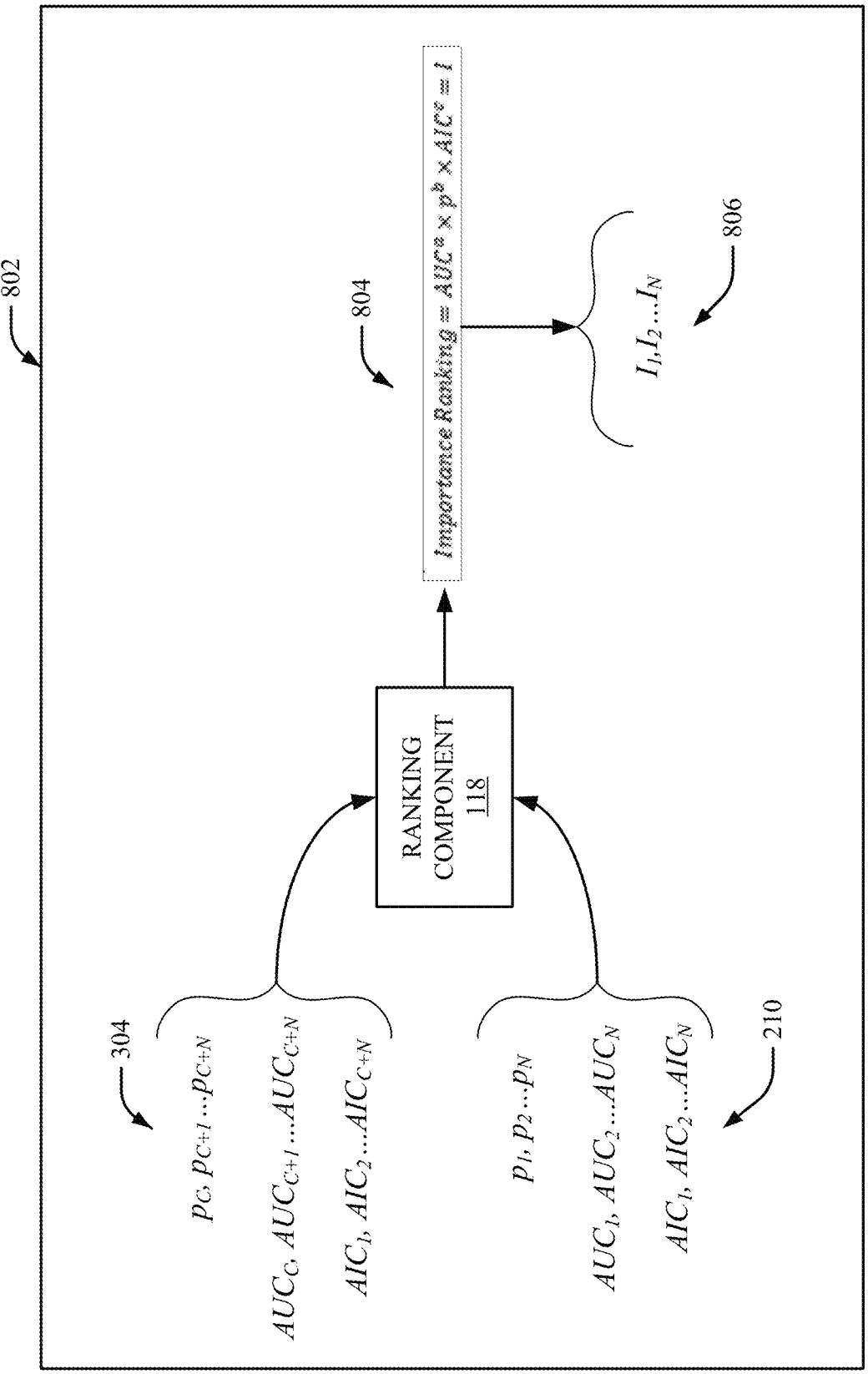
FIG. 8 is a diagram illustrating an overview of calculation of importance ranking by the ranking component using an example function to express importance one or more of raw parameters or raw parameter characteristics.

FIG. 8 is a flow diagram demonstrating computing, by the ranking component, various importance ranks 806 associated with their respective features. Within the diagram, receipt of one or more derived values 210 and one or more derived cluster values 304 by the ranking component are illustrated. An example function 804 is used to derive one or more importance ranks $I_1, I_2 \ldots I_N$ based upon the Akaike Information Criterion (AIC), Area under Curve (AUC), and p-values corresponding to their respective features. The example function for importance rank can be given as:

$$\text{Importance Ranking} = \text{AUC}/(p - \sqrt{\text{AIC}}) \qquad (1)$$

or $$\text{Importance Ranking} = \text{AUC}^a \times p^b \times \text{AIC}^c \qquad (2)$$

It should be noted that the importance ranking obtained from the equation (1) is merely an example expression used to generate a particular value of importance ranking. Other manipulations of this function are also within the scope of one or more embodiments of the subject disclosure.

Figure 9:
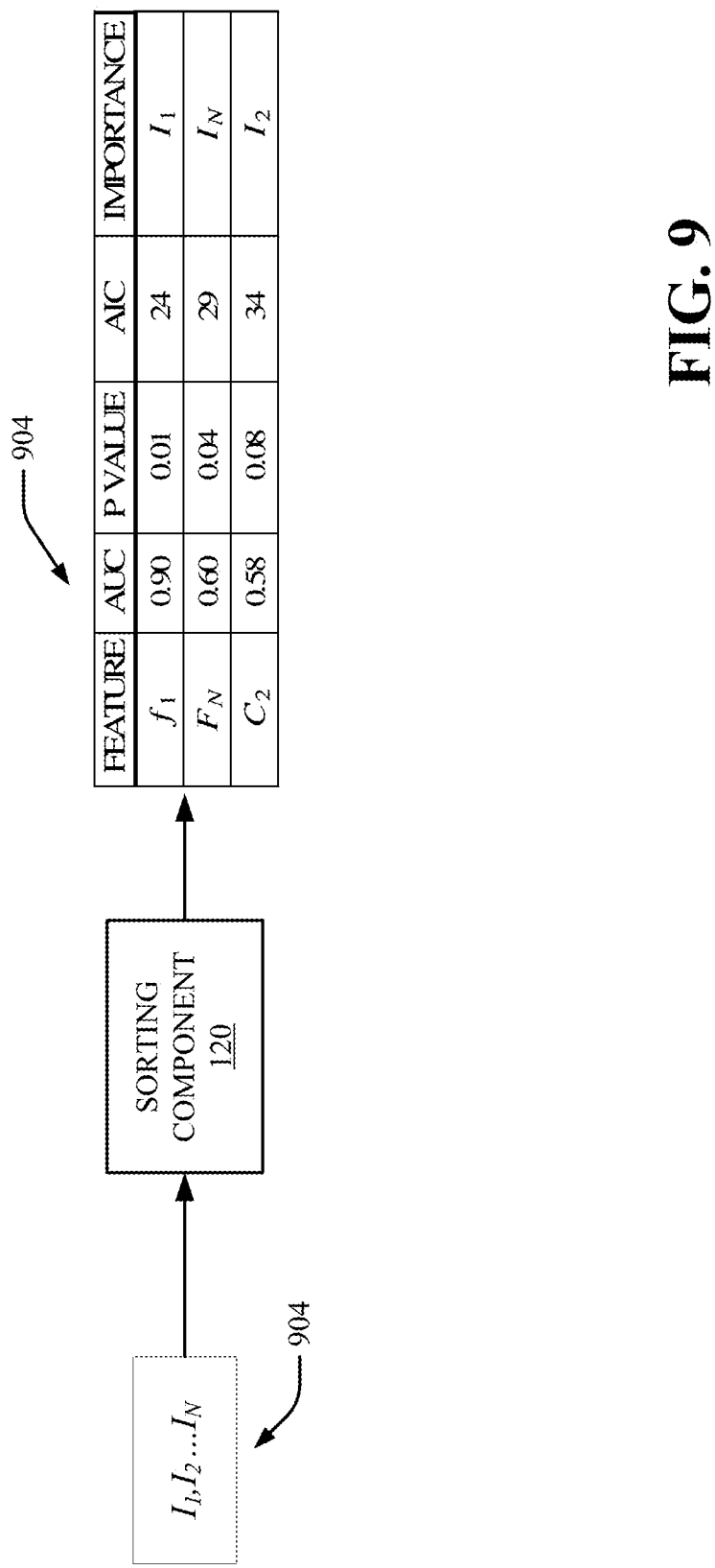
FIG. 9 is a diagram illustrating an overview of sorting based upon importance ranking within an example feature model.

FIG. 9 is a block diagram demonstrating, sorting, by the sorting component, within the classification model one or more features based upon the value of their respective importance rank. Once sorted, one or more features are arranged in a classification model 904. For example, the features may be listed in any manner including, but not limited to ascending importance rank value, descending importance rank value, or specifically grouped by range of importance value.

A classification model 904 lists the sorted features according to their respective importance ranks. In this particular example, each feature is sorted in ascending order based upon the value of their importance rank. Additionally, in line with one or more embodiments, this particular manipulation of the function (1), features the populating of the model with features listed from most relevant to least relevant with respect to a given event. Values for Akaike Information Criterion (AIC), Area under Curve (AUC), and p-values have been arbitrarily selected. As previously stated, "features" sorted in the classification model can be any raw parameter, raw parameter characteristic, or cluster(s) of one or both types.

Figure 10:
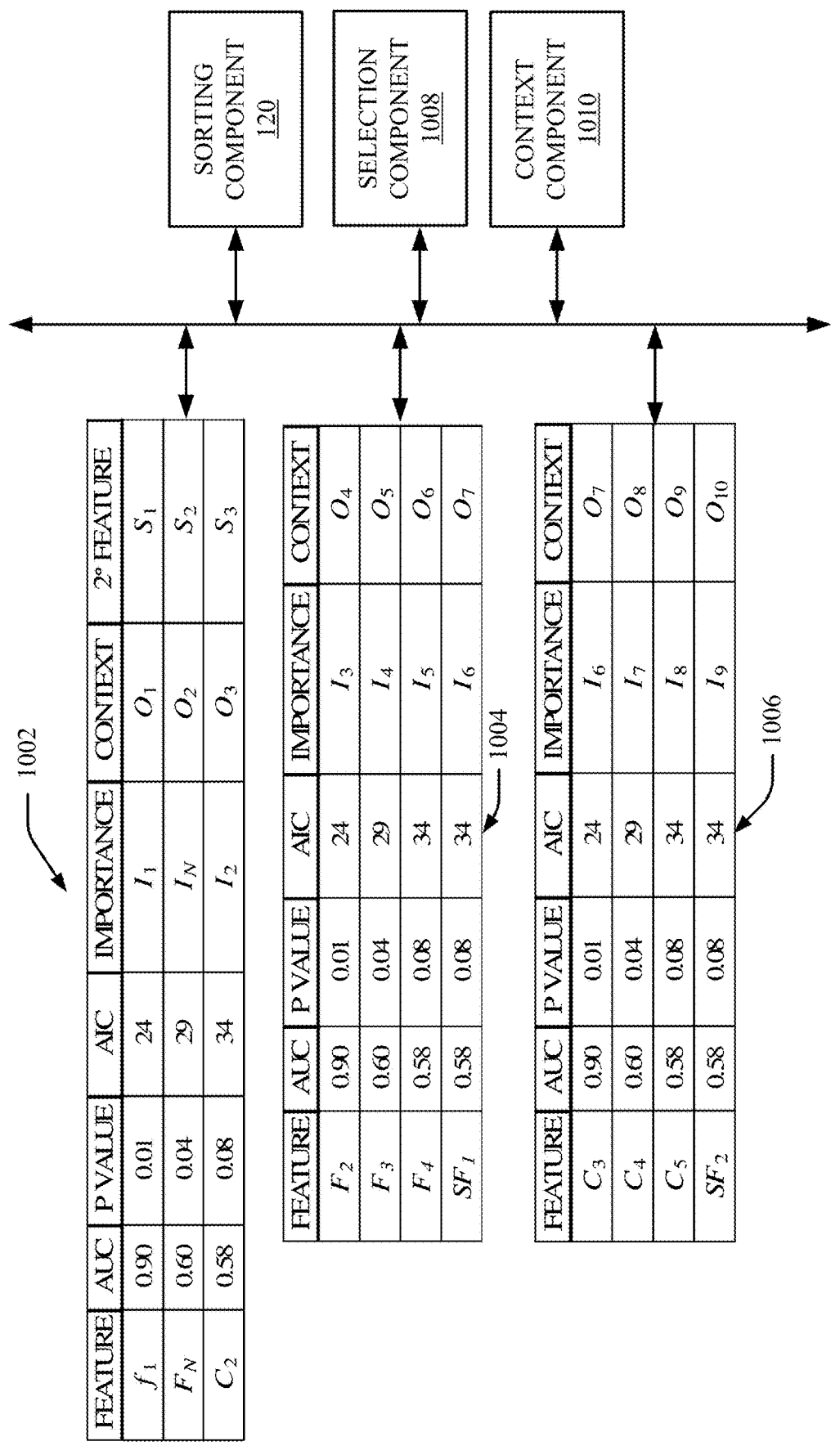
FIG. 10 is a diagram illustrating an overview of cross learning done by one or more classification models coupled to other classification models

FIG. 10 is a block diagram illustrating one or more embodiments wherein a classification model 1002 can be operatively coupled to classification models 1004 and 1006, facilitating cross learning between the models. In this manner, classification models from one aircraft's turbine jet engine would be able to train off of models from a separate aircraft's turbine jet engine, allowing for the model to learn potentially unanticipated impacts to jet engine performance including, but not limited to routine flight paths, climate differences, performance variation between differing aircraft models, and crew variables.

A selection component 1008 can be configured to incorporate a new feature into a classification model in order to observe its impact on model accuracy after training on the new feature. In an aspect presented in the subject disclosure, this element can be a rules based algorithm used for further selection, ranking, and sorting of features.

Context component 1010 can be configured to add a context marker to one or more features. The utility for the element in its present usage allows for comparison of features in various runtime environments, stages, or situations. For example, substantially any feature incorporating solely the raw parameter or a characteristic of engine exhaust pressure may differ between various situations such as takeoff, taxi, landing, ascent, descent, etc. A contextual marker for each feature further improves accuracy of the classification model training on that feature.

Figure 11:
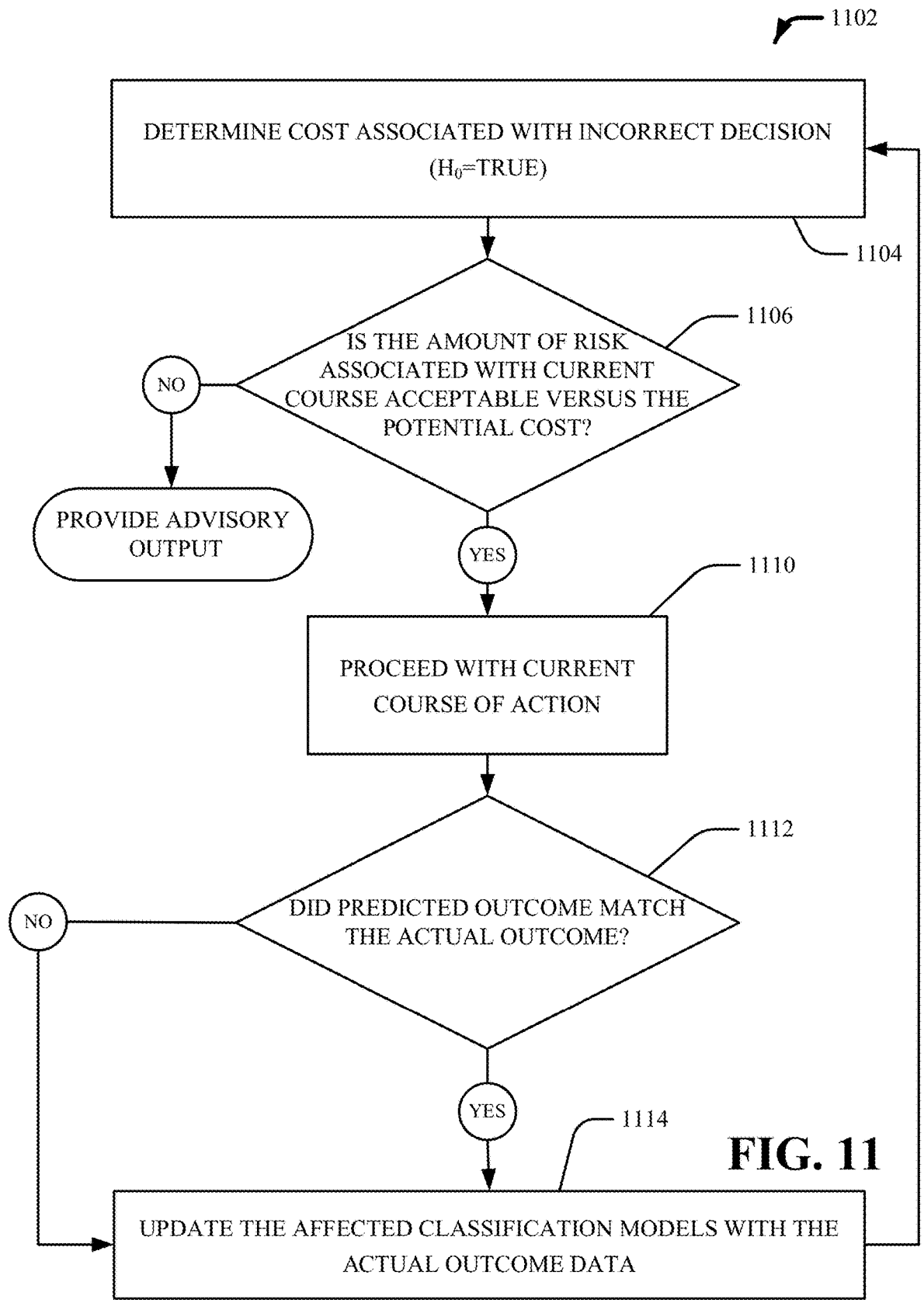
FIG. 11 is a diagram illustrating an overview of a utility based analysis of alternate decisions performed by the classification model.

FIG. 11 is a decision methodology outlining a utility based analysis performed by the classification mode in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

This analysis provides one or more metrics associated with a cost computation where the cost is that of an incorrect decision, calculated at act 1102. For example, if the result of an incorrect decision is a sheared external flap, the associated cost would presumably be much less than a ruptured fuel line. This preliminary determination is performed at act 1104. In an aspect, this determination can also take into account the element of likelihood, in which values of current features can give an indication as to the current overall risk of incurring an associated failure cost.

At 1106 a comparison is made regarding likelihood and cost of a failure event to the current and alternative courses of action. For example, an anomaly recognized by the classification model due to excessive vibration in an equipment component as a considered feature may be exacerbated if a flight path is altered to an area of higher wind shear or turbulence. In this aspect, the classification model could utilize cross learned patterns from route information identified by other classification models to influence decision making. If the likelihood and cost of a failure event are found to be too high for the given course of action, the classification model can generate an advisory output via one or more external user interface devices Alternate acts can precipitate from the comparison made at 1106. At 1108 an advisory output is generated in response to an unfavorable result of the comparison 1106, namely, one in which the likelihood and cost of a failure event outweigh the chance and cost savings of success. This advisory output can include, but is not limited to a course correction advisory, an advisory to ground the plane, a work notification, part order, work order, maintenance request, preventative maintenance request, or any other term generally referring to a maintenance activity performed on the aircraft or equipment. Conversely, act 1110 occurs in response to a favorable outcome with regards to the weighing of the aforementioned risks. Act 1110 would most plausibly be continuation of service or the designated flight path, however can also be a nominated as a defined criterion created by the system.

At 1112, a measurement is made regarding actual outcome against a defined criterion to determine whether that outcome matched a predicted outcome. In understanding that, in this example provided, the predicted outcome was a favorable result weighted against a reasonable amount of risk, the classification model can be configured to, in response to not satisfying a defined criterion, re-train itself based upon the degree to which the defined criterion has or has not been satisfied. It is to be understood that the proceeding act is the same for either judgment. The result is not to be considered purely binary in nature, rather, the illustration merely demonstrates that the results can differ, the degree to which affecting updating of the classification model at 1114.

At 1114, the classification model is updated in response to the determination made at 1112. Based upon various determinations, the classification model will update based on the respective features considered in the determination and subsequently repeat the calculation of the value of the associated failure cost at 1102

The systems or devices that have been described thus far have primarily been mentioned in applications pertaining to the arena of turbine jet engine root cause analysis or maintenance. It should be considered that these systems can be applied to any suitable number of operating environments, including automotive diagnostic systems, manufacturing facilities, public transit systems diagnostic methods, health care systems, or any other continuous operations environments. The goal of whose use within these environments is the correct diagnosis of a failed component, tissue, organ, part, tool, or piece of equipment particularly when the pool of potential failures is especially large. The subject systems would allow for a more expedient determination of as a result of the methods detailed herein.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIG. 12 illustrates a methodology and/or flow diagram in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Figure 12A:
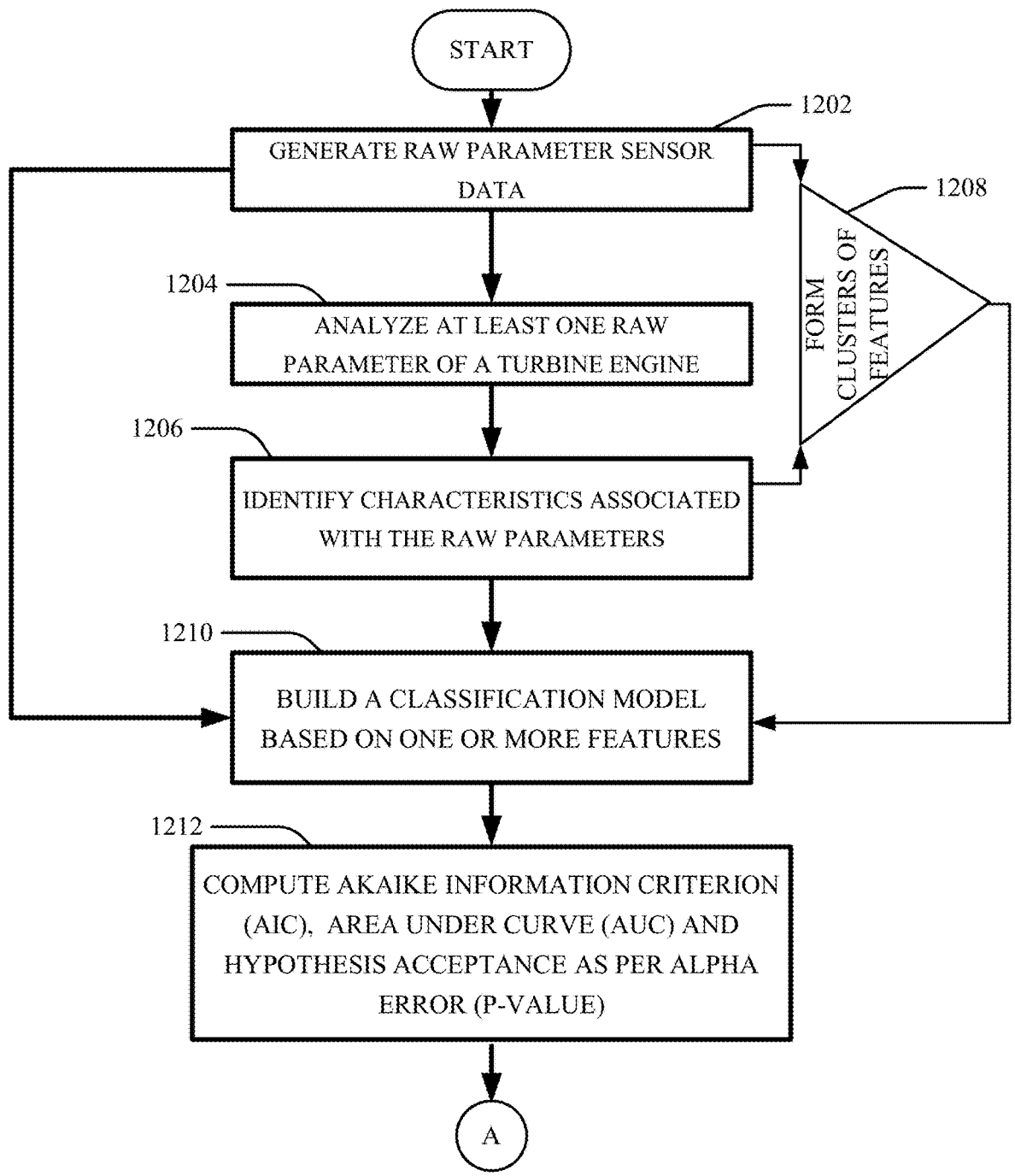
FIGS. 12A and 12B illustrate a flowchart of an example methodology of model building using a method of feature classification.
Figure 12B:
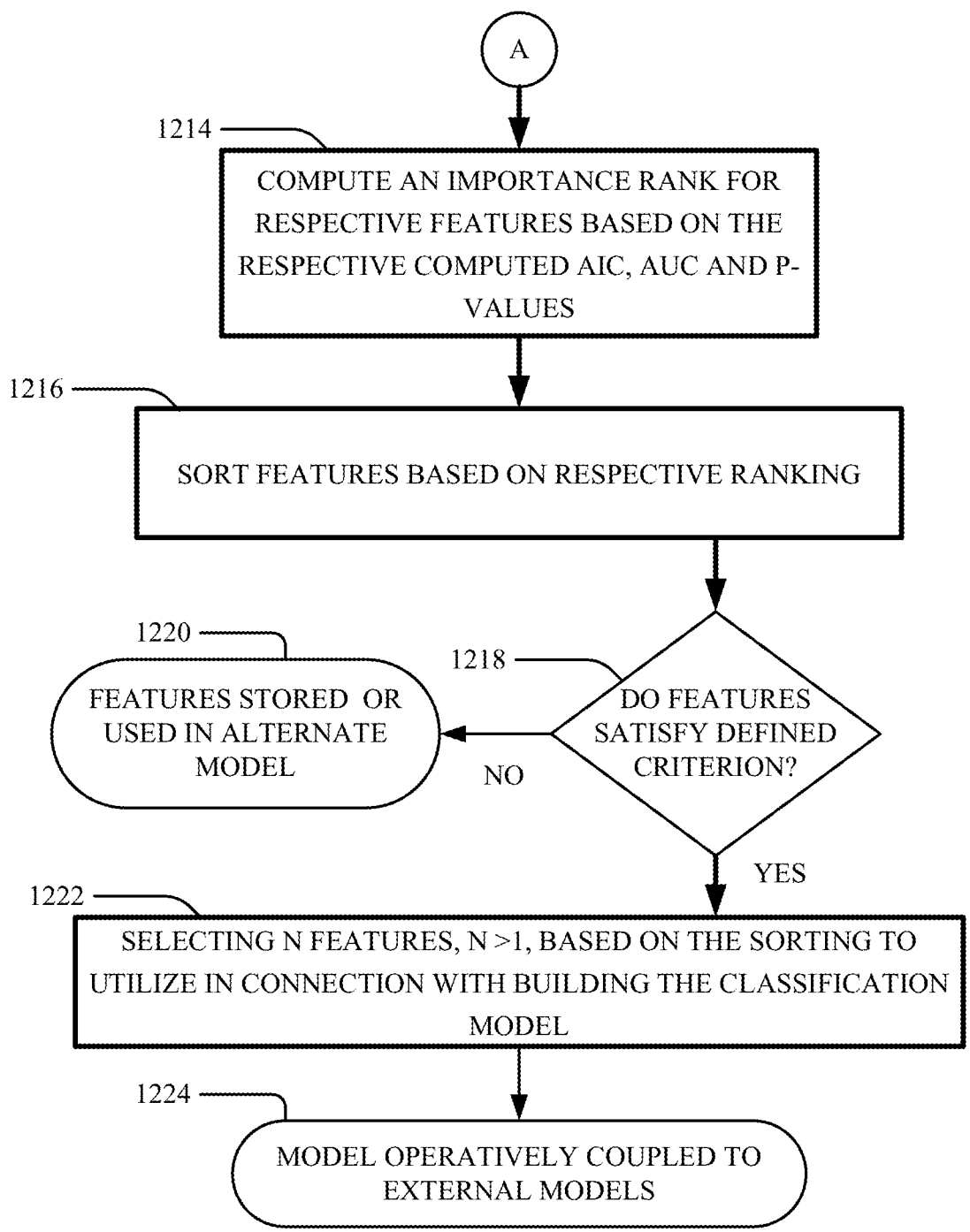

FIG. 12A and FIG. 12B illustrate a flow diagram of an example, non-limiting computer implemented method 1200 for selection of features for use in training one or more classification models. At 1202, one or more raw parameters is generated, by a system operatively coupled to a processor from the sensor(s). At 1204, one or more raw parameters is analyzed. At 1206, one or more characteristics of the raw parameters received by the system is identified. At 1208, one or more raw parameters or raw parameter characteristics can be grouped into clusters for evaluation by the system not unlike any other feature considered. At 1210 a classification model is built based upon one feature at a time of the set of features. At 1212, values for Akaike Information Criterion (AIC), Area under Curve (AUC), and p-values are computed corresponding to their respective feature values. At 1214, importance ranks are computed with respect to the aforementioned features, by the system, using an function (1) of Akaike Information Criterion (AIC), Area under Curve (AUC), and p-values. At 1214, subsequent importance ranks are computed, by the system, for clusters of respective raw parameters, raw parameter characteristics, or further grouped clusters. At 1216, features based on raw feature importance ranking are sorted, by the system. At 1218, a comparison is made to evaluate if a ranked feature satisfies a defined criterion. If that defined criterion is not made, the respective ranked features are stored in the system or use in an alternate model at 1220 At 1222, one or more features is selected, by the system, based on the sorting, to utilize in connection with building the classification model. In some cases, those models will be coupled to enable cross-learning at 1224.

Figure 13:
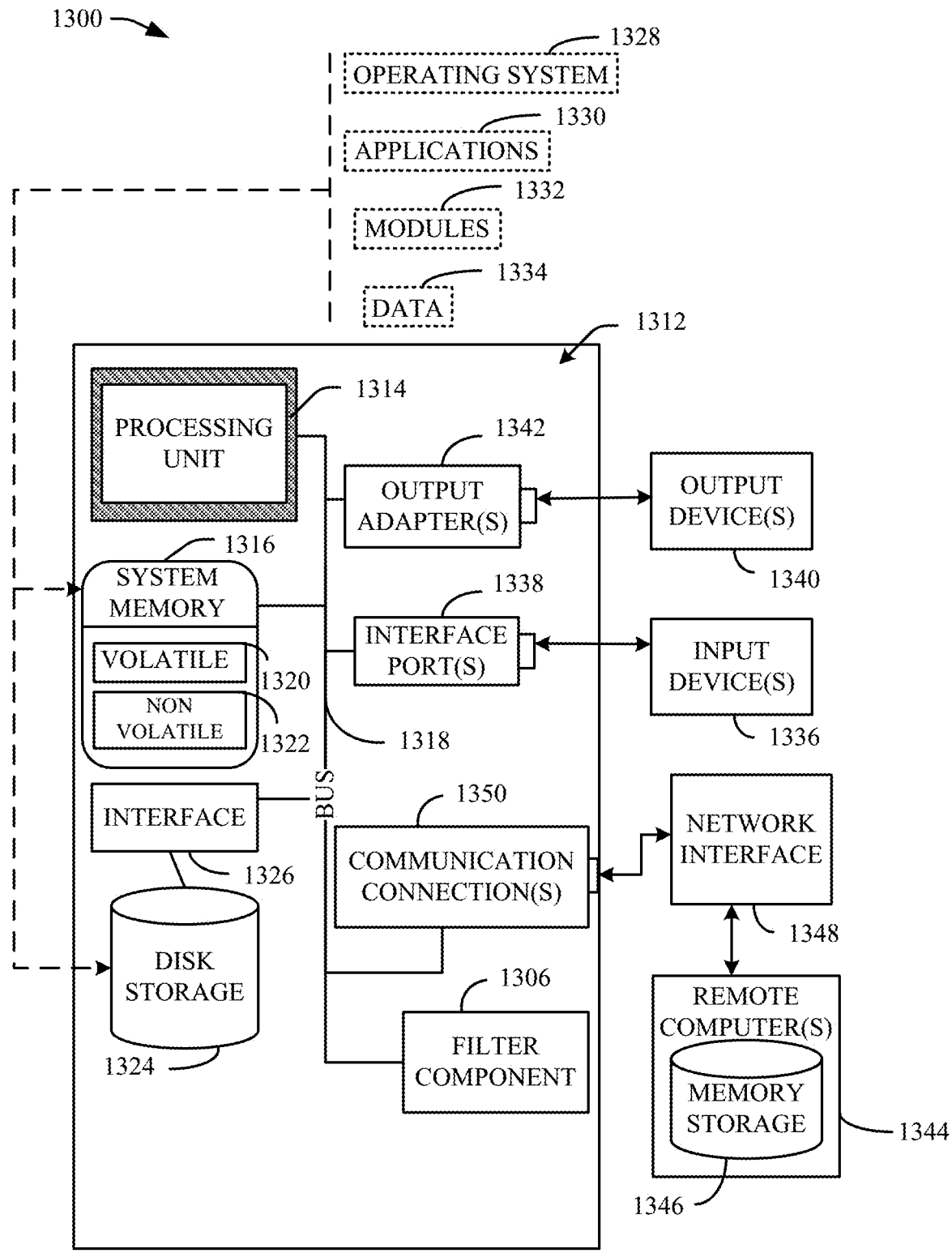
FIG. 13 is an example of a computing environment.

In order to provide a context for the various aspects of the disclosed subject matter, FIG. 13 as well as the following discussion are intended to provide a brief, general description of a suitable environment in which the various aspects of the disclosed subject matter may be implemented.

With reference to FIG. 13, a suitable environment 1300 for implementing various aspects of this disclosure includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1316 includes volatile memory 1320 and non-volatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1320 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1312 also includes removable/non-removable, volatile/non-volatile computer storage media. FIG. 13 illustrates, for example, a disk storage 1324. Disk storage 1324 includes, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used, such as interface 1326.

FIG. 13 also depicts software that acts as an intermediary between users and the basic computer resources described in the suitable operating environment 1300. Such software includes, for example, an operating system 1328. Operating system 1328, which can be stored on disk storage 1324, acts to control and allocate resources of the computer system 1312. System applications 1330 take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

What is claimed is:

1. A machine learning system, comprising:
   a processor that executes computer executable components stored in memory;
   a raw parameter analyzer that identifies characteristics associated with a set of respective raw parameters associated with a turbine jet engine;
   a model builder that builds a classification model based on one parameter at a time of the set of respective raw parameters and computes Akaike Information Criterion, Area under Curve, and Hypothesis acceptance as per alpha error (p-value), wherein the classification model is trained in part to perform a utility-based analysis, wherein a cost of making an incorrect decision resulting in a failure event associated with the turbine jet engine and a likelihood of the failure event occurring are weighed against a benefit of making a correct decision, and wherein the classification model generates a decision based on a result of the utility-based analysis;
   a ranking component that computes importance rank for respective raw parameters based on the respective computed Akaike Information Criterion, Area under Curve, and p-value;
   a sorting component that sorts features based on respective raw parameter importance ranking; and
   a selection component that selects at least two features based on the sorting to utilize in connection with building the classification model,
   wherein the classification model generates an advisory output, comprising a maintenance activity, via one or more external user interface devices in response to a determination that the cost of making the incorrect decision exceeds a threshold.

2. The system of claim 1, wherein the ranking component computes the importance rank as a function of Akaike Information Criterion, Area under Curve, and Hypothesis acceptance as per alpha error (p-value).

3. The system of claim 1 further comprising a clustering component that combines two or more of the selected features into respective clusters and computes Akaike Information Criterion, Area under Curve, and p-values for the respective clusters.

4. The system of claim 3, wherein the ranking component computes importance rank for the respective clusters, and the sorting component sorts the respective clusters based on importance rank, and the classification model is further trained based on the cluster ranking.

5. The system of claim 1, further comprising an interdependency component that learns interdependencies associated with the features.

6. The system of claim 1, wherein the classification model is operatively coupled to other classification models, and the respective classification models cross learn.

7. The system of claim 1, wherein the selection component adds a new feature in connection with building the classification model and compares accuracy of the classification model before and after training on the new feature.

8. The system of claim 1, further comprising a context component that adds a context parameter to the selected features in connection with building the classification model.

9. The system of claim 1, wherein the features comprise the characteristics and the set of respective raw parameters.

10. A method to facilitate building a classification model, comprising:
using a processor that executes computer executable components stored in memory to perform the following acts:
using a raw parameter analyzer to identify characteristics associated with a set of respective raw parameters associated with a turbine jet engine;
using a model builder to build a classification model based on one parameter at a time of the set of respective raw parameters and computes Akaike Information Criterion (AIC), Area under Curve (AUC) and Hypothesis acceptance as per alpha error (p-value), wherein the classification model is trained in part to perform a utility-based analysis, wherein a cost of making an incorrect decision resulting in a failure event associated with the turbine jet engine and a likelihood of the failure event occurring are weighed against a benefit of making a correct decision, and wherein the classification model generates a decision based on a result of the utility-based analysis;
using a ranking component to compute importance rank for respective raw parameters based on the respective computed AIC, AUC and p-value;
using a sorting component to sorts features based on respective raw parameter importance ranking; and
using a selection component to selects at least two features based on the sorting to utilize in connection with building the classification model,
wherein the classification model generates an advisory output, comprising a maintenance activity, via one or more external user interface devices in response to a determination that the cost of making the incorrect decision exceeds a threshold.

11. The method of claim 10, wherein the ranking component computes the importance rank as a function of Akaike Information Criterion, Area under Curve, and Hypothesis acceptance as per alpha error (p-value).

12. The method of claim 10 further comprising using a clustering component to combines at least two of the selected features into respective clusters and computes AIC, AUC and p-values for the respective clusters.

13. The method of claim 12, further comprising using the ranking component to compute importance rank for the respective clusters, and the sorting component sorts the respective clusters based on importance rank, and the classification model is further trained based on the cluster ranking.

14. The method of claim 10, further comprising using an interdependency component to learn interdependencies associated with the features.

15. The method of claim 10, further comprising using the selection component to add a new feature in connection with building the classification model and compares accuracy of the classification model before and after training on the new feature.

16. The method of claim 10, further comprising using a context component to add respective context parameters to the selected features in connection with building the classification model.

17. The method of claim 10, wherein the features comprise the characteristics and the set of respective raw parameters.

18. A non-transitory computer readable storage device comprising instructions that, in response to execution, cause a system comprising a processor to perform operations, comprising:
using a raw parameter analyzer to identify characteristics associated with a set of respective raw parameters associated with a turbine jet engine;
using a model builder to build a classification model based on one parameter at a time of the set of respective raw parameters and computes Akaike Information Criterion (AIC), Area under Curve (AUC) and Hypothesis acceptance as per alpha error (p-value);
using a ranking component to compute importance rank for respective raw parameters based on the respective computed AIC, AUC and p-value, wherein the classification model is trained in part to perform a utility-based analysis, wherein a cost of making an incorrect decision resulting in a failure event associated with the turbine jet engine and a likelihood of the failure event occurring are weighed against a benefit of making a correct decision, and wherein the classification model generates a decision based on a result of the utility-based analysis;
using a sorting component to sorts features based on respective raw parameter importance ranking; and
using a selection component to selects at least two features based on the sorting to utilize in connection with building the classification model,
wherein the classification model generates an advisory output, comprising a maintenance activity, via one or more external user interface devices in response to a determination that the cost of making the incorrect decision exceeds a threshold.

19. The non-transitory computer readable storage device of claim 18 further comprising instructions to compute the importance rank as a function of Akaike Information Criterion, Area under Curve, and Hypothesis acceptance as per alpha error (p-value).

20. The non-transitory computer readable storage device of claim 18 further comprising instructions to use an interdependency component to learn interdependencies associated with the features.

* * * * *